US008150098B2

(12) United States Patent
Gallagher et al.

(10) Patent No.: US 8,150,098 B2
(45) Date of Patent: Apr. 3, 2012

(54) GROUPING IMAGES BY LOCATION

(75) Inventors: Andrew C. Gallagher, Fairport, NY (US); Madirakshi Das, Penfield, NY (US); Alexander C. Loui, Penfield, NY (US); Jens C. Farmer, Hooksett, NH (US)

(73) Assignee: Eastman Kodak Company, Rochester, NY (US)

( * ) Notice: Subject to any disclaimer, the term of this patent is extended or adjusted under 35 U.S.C. 154(b) by 956 days.

(21) Appl. No.: 11/960,800

(22) Filed: Dec. 20, 2007

(65) Prior Publication Data

US 2009/0161962 A1 Jun. 25, 2009

(51) Int. Cl.
*G06K 9/00* (2006.01)

(52) U.S. Cl. ........ 382/100; 382/190; 382/192; 382/195; 382/224; 382/225

(58) Field of Classification Search .................. 382/100, 382/181, 190–197, 201, 203, 224–227, 305, 382/306
See application file for complete search history.

(56) References Cited

U.S. PATENT DOCUMENTS

| | | | | |
|---|---|---|---|---|
| 5,930,783 | A * | 7/1999 | Li et al. | 382/230 |
| 6,240,423 | B1 * | 5/2001 | Hirata | 382/305 |
| 6,282,317 | B1 | 8/2001 | Luo | |
| 7,961,982 | B2 * | 6/2011 | Sibiryakov et al. | 382/294 |
| 2002/0131641 | A1 * | 9/2002 | Luo et al. | 382/218 |
| 2004/0001631 | A1 | 1/2004 | Camara et al. | |
| 2004/0126038 | A1 * | 7/2004 | Aublant et al. | 382/305 |
| 2004/0208365 | A1 | 10/2004 | Loui et al. | |
| 2008/0069480 | A1 * | 3/2008 | Aarabi et al. | 382/305 |

FOREIGN PATENT DOCUMENTS

EP 1 246 085 A2 10/2002

OTHER PUBLICATIONS

David G. Lowe, "Distinctive Image Features from Scale-Invariant Keypoints", International Journal of Computer Vision, vol. 60 No. 2, 2004, pp. 91-110.*
Kentaro Toyama, Ron Logan, Asta Roseway and P. Anadan, "Geographic Location Tags on Digital Images", Proceedings of the eleventh ACM international conference on Multimedia, New York, NY, 2003 pp. 156-166.*
J.C. Platt et al.: "AutoAlbum: Clustering Digital Photographs Using Probabilistic Model Merging", Proc. IEEE Workshop on Content-Based Access of Image and Video Libraries, Jun. 12, 2000, pp. 96-100, XP002530411, Hilton Head Island, SC, USA, p. 97.
Laiyun Qing et al.: "A Framework for Background Detection in Video", Proc. Conf. Advances in Multimedia Information Processing, Dec. 16-18, 2002, pp. 799-805, XP002530412, Hsinchu, Taiwan.
Sharon et al, Fast Multiscale Image Segmentation, IEEE Conf. on Computer Vision and Pattern Recognation, 2000.
Yu et al, Segmentation Given Partial Grouping Constraints, IEEE Trans. on Pattern Analysis and Machine Intelligence, Feb. 2004.

* cited by examiner

*Primary Examiner* — Matthew Bella
*Assistant Examiner* — Eric Rush
(74) *Attorney, Agent, or Firm* — Raymond L. Owens

(57) ABSTRACT

A method of grouping images captured in a common location, including receiving a collection of images; classifying the images into a set of events, where each image in the collection belongs to no more than one event; analyzing background region(s) of images from each event to determine one or more features that represent the event; and comparing features from at least two events to determine which events occurred in a common location.

4 Claims, 7 Drawing Sheets

GROUPING IMAGES BY LOCATION

FIELD OF THE INVENTION

The invention relates generally to the field of digital image processing, and in particular to a method for grouping images by location based on automatically detected backgrounds in the image.

BACKGROUND OF THE INVENTION

The proliferation of digital cameras and scanners has lead to an explosion of digital images, creating large personal image databases where it is becoming increasingly difficult to find images. In the absence of manual annotation specifying the content of the image (in the form of captions or tags), the only dimension the user can currently search along is time—which limits the search functionality severely. When the user does not remember the exact date a picture was taken, or if the user wishes to aggregate images over different time periods (e.g. images taken at Niagara Falls across many visits over the years, images of person A), he/she would have to browse through a large number of irrelevant images to extract the desired image(s). A compelling alternative is to allow searching along other dimensions. Since there are unifying themes, such as the presence of a common set of people and locations, throughout a user's image collection; people present in images and the place where the picture was taken are useful search dimensions. These dimensions can be combined to produce the exact sub-set of images that the user is looking for. The ability to retrieve photos taken at a particular location can be used for image search by capture location (e.g. find all pictures taken in my living room) as well as to narrow the search space for other searches when used in conjunction with other search dimensions such as date and people present in images (e.g. looking for the picture of a friend who attended a barbecue party in my backyard).

In the absence of Global Positioning System (GPS) data, the location the photo was taken can be described in terms of the background of the image. Images with similar backgrounds are likely to have been taken at the same location. The background could be a living room wall with a picture hanging on it, or a well-known landmark such as the Eiffel tower.

There has been significant research in the area of image segmentation where the main segments in an image are automatically detected (for example, "Fast Multiscale Image Segmentation" by Sharon et al in proceedings of IEEE Conf. on Computer Vision and Pattern Recognition, 2000), but no determination is made on whether the segments belong to the background. Segmentation into background and non-background has been demonstrated for constrained domains such as TV news broadcasts, museum images or images with smooth backgrounds. A recent work by S. Yu and J. Shi ("Segmentation Given Partial Grouping Constraints" in IEEE Transactions on Pattern Analysis and Machine Intelligence, February 2004), shows segregation of objects from the background without specific object knowledge. Detection of main subject regions is also described in commonly assigned U.S. Pat. No. 6,282,317 entitled "Method for Automatic Determination of Main Subjects in Photographic Images" by Luo et al. However, there has been no attention focused on the background of the image. The image background is not simply the image regions left when the main subject regions are eliminated; main subject regions can also be part of the background. For example, in a picture of the Eiffel Tower, the tower is the main subject region; however, it is part of the background that describes the location the picture was taken.

SUMMARY OF THE INVENTION

The present invention discloses a method of identifying a particular background feature in a digital image, and using such feature to identify images in a collection of digital images that are of interest, comprising:

(a) receiving a collection of images;

(b) classifying the images into a set of events, where each image in the collection belongs to no more than one event;

(c) analyzing background region(s) of images from each event to determine one or more features that represent the event; and (d) comparing features from at least two events to determine which events occurred in a common location.

Using background and non-background regions in digital images allows a user to more easily find images taken at the same location from an image collection. Further, this method facilitates annotating the images in the image collection. Furthermore, the present invention provides a way for eliminating non-background objects that commonly occur in images in the consumer domain.

DETAILED DESCRIPTION OF THE INVENTION

Figure 1:
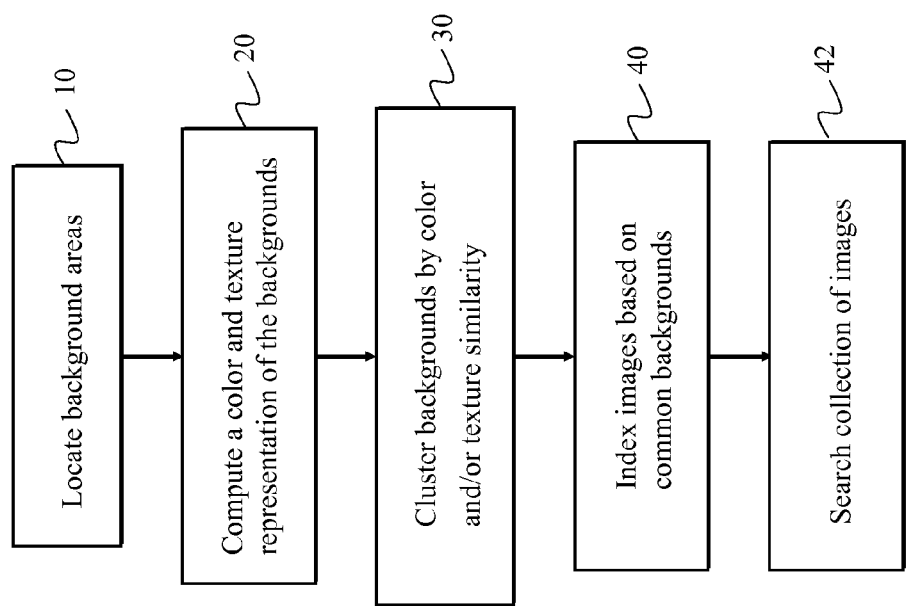
FIG. 1 is a flowchart of the basic steps of the method of the present invention.

The present invention can be implemented in computer systems as will be well known to those skilled in the art. The main steps in automatically indexing a user's image collection by the frequently occurring picture-taking locations (as shown in FIG. 1) are as follows:

(1) Locating the background areas in images 10;

(2) Computing features (color and texture) describing these background areas 20;

(3) Clustering common backgrounds based on similarity of color or texture or both 30;

(4) Indexing images based on common backgrounds 40; and (5) Searching the image collections using the indexes generated 42.

As used herein, the term "image collection" refers to a collection of a user's images and videos. For convenience, the term "image" refers to both single images and videos. Videos are a collection of images with accompanying audio and sometimes text. The images and videos in the collection often include metadata.

The background in images is made up of the typically large-scale and immovable elements in images. This excludes mobile elements such as people, vehicles, animals, as well as small objects that constitute an insignificant part of the overall background. Our approach is based on removing these common non-background elements from images—the remaining area in the image is assumed to be the background.

Figure 2:
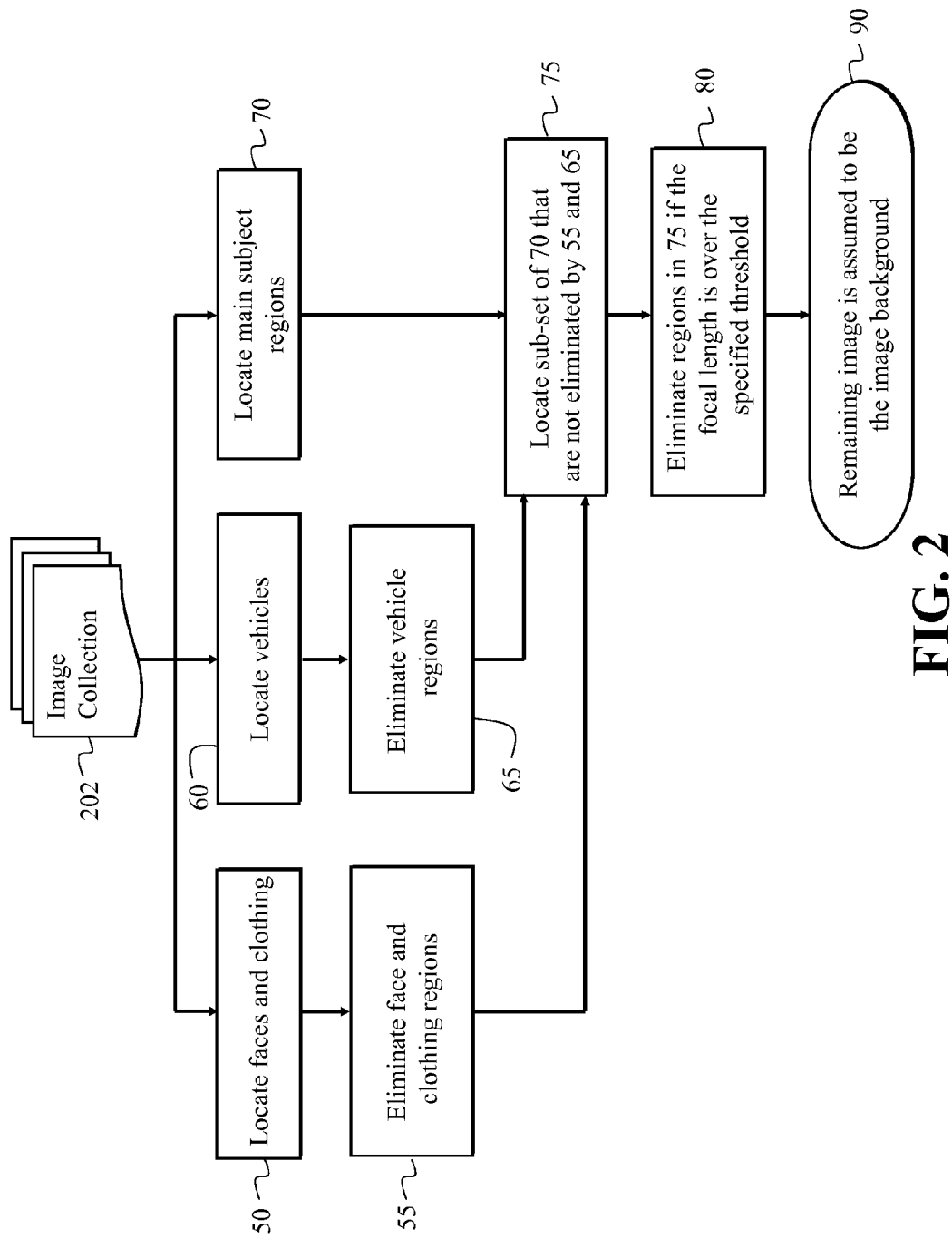
FIG. 2 shows more detail of block 10 from FIG. 1.
Figure 3:
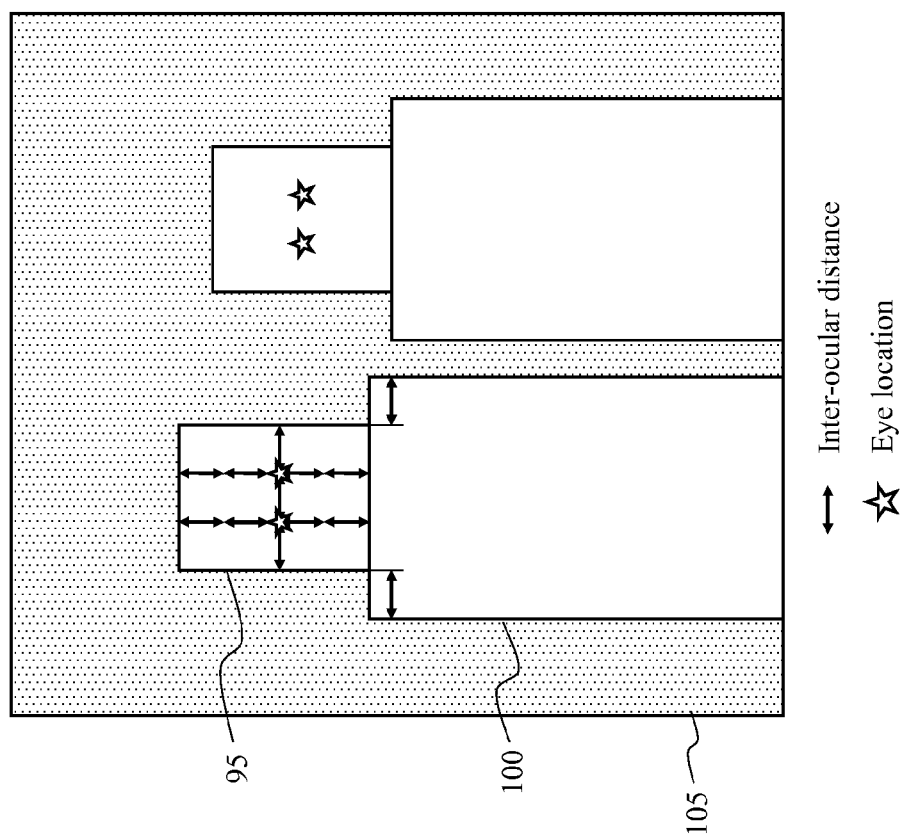
FIG. 3 is an illustration showing the areas in an image hypothesized to be the face area, the clothing area and the background area based on the eye locations produced by automatic face detection.

Referring to FIG. 2, images are processed to detect people 50, vehicles 60 and main subject regions 70. Since the end user of image organization tools will be consumers interested in managing their family photographs, photographs containing people form the most important component of these images. In such people images, removing the regions in the image corresponding to faces and clothing leaves the remaining area as the background. Referring to FIG. 2, human faces are located 50 in the digital images. There are a number of known face detection algorithms that can be used for this purpose. In a preferred embodiment, the face detector described in "Probabilistic Modeling of Local Appearance and Spatial Relationships for Object Recognition", H. Schneiderman and T. Kanade, Proc. of CVPR '98, pp. 45-51 is used. This detector implements a Bayesian classifier that performs maximum a posterior (MAP) classification using a stored probability distribution that approximates the conditional probability of face given image pixel data. The face detector outputs the left and right eye locations of faces found in the image(s). FIG. 3 shows the areas in the image hypothesized to be a face region 95, a clothing region 100 and a background region 105 based on the eye locations produced by the face detector. The sizes are measured in terms of the inter-ocular distance, or IOD (distance between the left and right eye location). The face region 95 covers an area of three times IOD by four times IOD as shown. The clothing region 100 covers five times IOD and extends to the bottom of the image. The remaining area in the image is treated as the background region 105. Note that some clothing region 100 can be covered by other faces and clothing areas corresponding to those faces.

Referring to FIG. 2, vehicle regions 60 are detected using the method described in "Car Detection Based on Multi-Cues Integration" by Zhu et al in Proceedings of the $17^{th}$ International Conference on Pattern Recognition, 2004 for detecting cars in outdoor still images. In this method, global structure cues and local texture cues from areas of high response to edge and corner point templates designed to match cars, are used to train a SVM classifier to detect cars.

Referring to FIG. 2, the main subject regions in the images from the image collection 202 are detected 70 using the method described in commonly assigned U.S. Pat. No. 6,282,317 entitled "Method for Automatic Determination of Main Subjects in Photographic Images". This method performs perceptual grouping on low-level image segments to form larger segments corresponding to physically coherent objects, and uses structural and semantic saliency features to estimate a belief that the region is the main subject using a probabilistic reasoning engine. The focal length registered in the EXIF metadata associated with the image is considered to be a proxy for the distance of the subject from the camera. A threshold (say, 10 mm) is used to separate main subjects that are not in the background from main subjects that are further away and therefore, more likely to be a part of the background. If the focal length is greater than the threshold, the main subject regions remaining in the image are eliminated. This would eliminate objects in the image that are too close to the camera to be considered to be a part of the background.

Referring to FIG. 2, the face and clothing regions, vehicle regions and main subject regions that are closer than a specified threshold are eliminated 75 from the images 55, 65, 80, and the remaining image is assumed to be the image background 90. In 75, main subject regions are considered along with other detected semantic regions (e.g. face, clothing and vehicles) and the background is considered to be regions of the image that are neither face, nor clothing, nor vehicles, nor main subjects. In addition, in 80, focal length (i.e. focus distance) is considered to eliminate as background regions of the image which are close to the camera (and therefore more likely to be the subject).

To make the background description more robust, backgrounds from multiple images which are likely to have been taken at the same location are merged. Backgrounds are more likely to be from the same location when they were detected in images taken as part of the same event. A method for automatically grouping images into events and sub-events based on date-time information and color similarity between images is described in U.S. Pat. No. 6,606,411 B1, to Loui and Pavie (which is hereby incorporated herein by reference). The event-clustering algorithm uses capture date-time information for determining events. Block-level color histogram similarity is used to determine sub-events. Each sub-event extracted using U.S. Pat. No. 6,606,411 has consistent color distribution, and therefore, these pictures are likely to have been taken with the same background.

Figure 4:
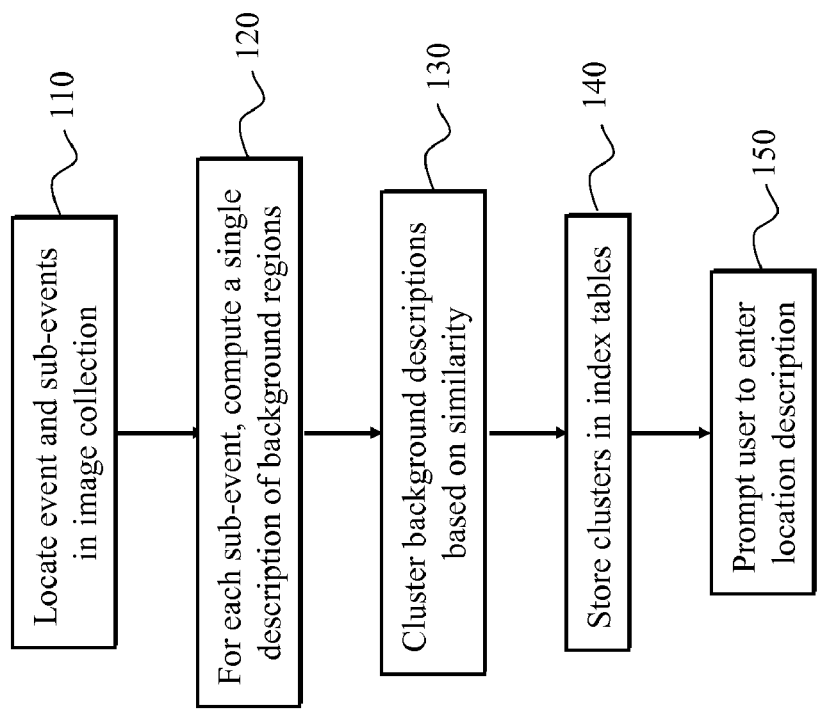
FIG. 4 is a flowchart of the method for generating, storing and labeling groups of images identified as having similar backgrounds.

Referring to FIG. 4, the user's image collection is divided into events and sub-events 110 using the commonly-assigned method described by Loui et al in U.S. Pat. No. 6,606,411. For each sub-event, a single color and texture representation is computed for all background regions from the images in the sub-event taken together 120. The color and texture are separate features which will be searched in the one or more background regions. The color and texture representations and similarity are derived from commonly-assigned U.S. Pat. No. 6,480,840 by Zhu and Mehrotra. According to their method, the color feature-based representation of an image is based on the assumption that significantly sized coherently colored regions of an image are perceptually significant. Therefore, colors of significantly sized coherently colored regions are considered to be perceptually significant colors. Therefore, for every input image, its coherent color histogram is first computed, where a coherent color histogram of an image is a function of the number of pixels of a particular color that belong to coherently colored regions. A pixel is considered to belong to a coherently colored region if its color is equal or similar to the colors of a pre-specified minimum number of neighboring pixels. Furthermore, a texture feature-based representation of an image is based on the assumption that each perceptually significant texture is composed of large numbers of repetitions of the same color transition(s). Therefore, by identifying the frequently occurring color transitions and analyzing their textural properties, perceptually significant textures can be extracted and represented. For each agglomerated region (formed by the pixels from all the background regions in a sub-event), a set of dominant colors and textures are generated that describe the region. Dominant colors and textures are those that occupy a significant proportion (according to a defined threshold) of the overall pixels. The similarity of two images is computed as the similarity of their significant color and texture features as defined in U.S. Pat. No. 6,480,840.

Video images can be processed using the same steps as still images by extracting key-frames from the video sequence and using these as the still images representing the video. There are many published methods for extracting key-frames from video. As an example, Calic and Izquierdo propose a real-time method for scene change detection and key-frame extraction by analyzing statistics of the macro-block features extracted from the MPEG compressed stream in "Efficient Key-Frame Extraction and Video Analysis" published in IEEE International Conference on Information Technology: Coding and Computing, 2002.

Referring to FIG. 4, the color and texture features derived from each sub-event forms a data point in the feature space. These data points are clustered into groups with similar features 130. A simple clustering algorithm that produces these groups is listed as follows, where the reference point can be the mean value of points in the cluster:

0. Initialize by picking a random data point as a cluster of one with itself as the reference point.
1. For each new data point,
2. Find distances to reference points of existing clusters
3. If (minimum distance<threshold)
4. Add to cluster with minimum distance
5. Update reference point for the cluster in 4.
6. else Create new cluster with data point In addition, text can be used as a feature and detected in image backgrounds using published methods such as "Text-Finder: An Automatic System to Detect and Recognize Text in Images," by Wu et al in IEEE Transactions on Pattern Analysis & Machine Intelligence, November 1999, pp. 1224-1228. The clustering process can also use matches in text found in image backgrounds to decrease the distance between those images from the distance computed by color and texture alone.

Referring to FIG. 4, the clusters are stored in index tables 140 that associate a unique location with the images in the cluster. Since these images have similar backgrounds, they are likely to have been captured at the same location. These clusters of images can be displayed on a display so that users can view the clusters and, optionally, the user can be prompted to provide a text label 150 to identify the location depicted by each cluster (e.g. "Paris", "Grandma's house"). The user labels will be different for different locations, but clusters that depict the same location (even though there is no underlying image similarity detected), may be labeled with the same text by the user. This location descriptor will be described in more detail with reference to FIG. 5 and is used to tag all images in that cluster. Additionally, the location descriptor can also be used to automatically caption the images. The location descriptor can be stored in association with the image(s) for later use to find or annotate the image(s).

The index tables 140 mapping a location (that may or may not have been labeled by the user) to images can be used when the user searches their image collection to find images taken at a given location. There can be multiple ways of searching. The user can provide an example image to find other images taken at the same or similar location. In this case, the system searches the collection by using the index tables 140 to retrieve the other images from the cluster that the example image belongs to. Alternatively, if the user has already labeled the clusters, they can use those labels as queries during a text-based search to retrieve these images. In this case, the search of the image collection involves retrieving all images in clusters with a label matching the query text. The user may also find images with similar location within a specific event, by providing an example image and limiting the search to that event.

It should also be clear that any number of features can be searched in the background regions—color and texture being used as examples in this description. For example, features can include information from camera meta-data stored in image files such as capture date and time or whether the flash fired. Features can also include labels generated by other ways—for example, matching the landmark in the background to a known image of the Eiffel Tower or determining who is in the image using face recognition technology. If any images in a cluster have attached GPS coordinates, these can be used as a feature in other images in the cluster.

Figure 5:
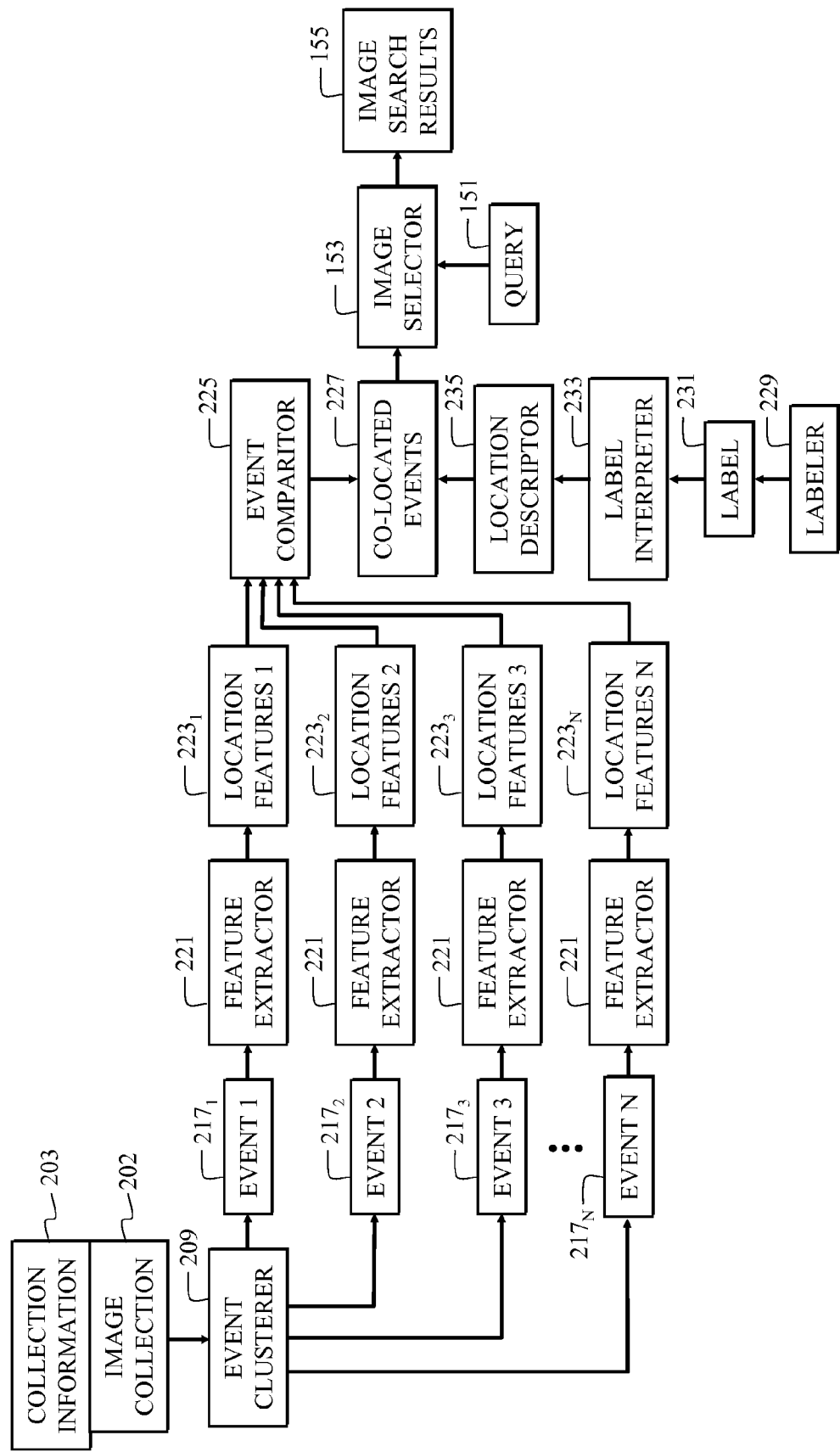
FIG. 5 is a flowchart of the method for segmenting an image collection into events, extracting features, and using these features to find co-located events.

FIG. 5 describes an alternative embodiment of the present invention. An image collection 202 contains digital images and videos, along with collection information 203. An event clusterer 209 segments the digital images and videos into events, 217. As previously described, the preferred event clusterer is described by Loui et al in U.S. Pat. No. 6,606,411 issued on Aug. 12, 2003. A digital image from the image collection 202 belongs to at most one of the events 217. A feature extractor 221 is applied to the images and videos from each event, producing location features 223. The feature extractor 221 seeks background features from the images, as described in reference to FIG. 2. Once the background of the images are determines, features are extracted by the feature extractor 221 and these location features 223 represent the corresponding event 217. The preferred features that are extracted from the background features are the SIFT features, described by Lowe in International Journal of Computer Vision, Vol 60, No 2., 2004. This method uses keypoint selection based on maxima and minima of difference-of-Gaussians and describes these keypoints using gradient magnitude and orientation in that region. The keypoints typically represent interesting edges and corners in an image. Lowe also describes methods for using SIFT to match patterns even when other parts of the image change and there is change in scale and orientation of the pattern. An alternative to SIFT that also can match interest points in images where the scale may differ is SURF (Speeded up Robust Features) by Bay et al in $9^{th}$ ECCV, 2006. This is a faster method based on sums of 2D Haar wavelet responses that makes an efficient use of integral images.

The event comparator 225 compares the location features 223 from different events find images having matching backgrounds. When two events contain at least one image with matching background, it is likely the images were captured in the same location. Furthermore, a photographic event typically occurs in one location. When two events share an image having similar backgrounds, it is likely the two images were captured in the same location, and therefore likely that the two events share the same location.

In one embodiment, the event comparator 225 compares each pair of images, generating an affinity matrix W with dimensions M×M, where M is the number of images in the image collection 202. The elements of W are $w(i,j)$ where $w(i,j)$ are the likelihood that the images i and j were captured in the same location, given the location features 203 extracted for each of the images. By definition, the $w(j,j)=1$, and $w(i,j)=1$ when the ith and the jth image are from the same event 217. The elements of the affinity matrix $w(i,j)$ are referred to as match scores 640.

Figure 7:
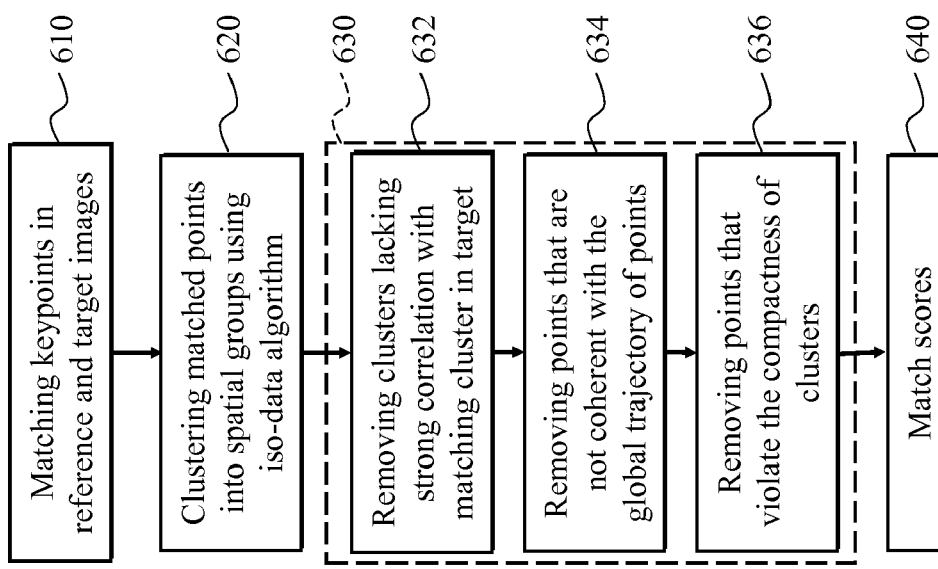
FIG. 7 is a flowchart illustrating the method of the event comparator for determining if two images were captured in a common location.

FIG. 7 describes a method used by the event comparator 225 for ascertaining the likelihood that a target image and a reference image were captured in the same location. Matching SIFT features using the method described by Lowe produces a set of matched keypoints between the reference and target images 610. However, in cluttered scenes such as consumer images, false matches are quite common. False matches occur when points matched do not correspond to the same objects in the two scenes. To remove false matches, a number of constraints are imposed on the matched points. As the first step, the matched points are clustered 620 into spatial groups in each image based on the 2D Euclidean distance between the points. In the preferred embodiment, the ISO-DATA clustering algorithm is used. Fast implementations of this algorithm are available (see N. Memarsadeghi et al in *International Journal of Computational Geometry and Applications*, 2006). Outlier points and clusters with less than a certain number of points (e.g. 5) are eliminated. The remaining clustered keypoints are then passed through a filter 630 that applies a number of constraints aimed at removing false matches. Since keypoints on the same object are spatially constrained to the region occupied by the object, it is expected that clusters in the reference image will correspond to cluster (s) in the target image for true matches. A correlation score is determined for each cluster in the reference image which is computed as the proportion of points in this cluster that match points in the cluster in the target image that has the strongest match (i.e. largest number of points matched with this cluster). Clusters that have correlation scores below a threshold (e.g. 0.5) are eliminated 632. The next constraint ensures that the global trajectory of points from the reference to the target is consistent i.e. all objects in the scene move in the same general direction. For all remaining points in the reference image, an average direction is computed for the trajectory of the points between the reference and target images. Points that deviate by more than a certain standard deviation ($\sigma$) of this average direction (e.g. 1.5 $\sigma$) are eliminated 634. Next, the centroid of each cluster in the reference image is computed and points that fall outside a certain standard deviation of this centroid are eliminated 636. This constraint eliminates spatially outlier points within a cluster. The order of applying the constraints during the filtering process 630 is not important. If there are keypoints that remain after the filtering process, this indicates a match between the reference and target image. The larger the number of keypoints left, the more reliable the match, so the likelihood of match is proportional to the number of matching keypoints remaining.

There are other methods for determining whether a target image and a reference image have overlapping features points in the background. For example, the technique described by M. Leordeanu and M. Hebert, "A Spectral Technique for Correspondance Problems Using Pairwise Constraints", ICCV, October 2005, can alternatively be used to determine whether a target image and a reference image both contain similar background feature points that are geometrically consistent. In this case, the method of Leordeanu et al. for matching data features, is applied to are feature points from the image backgrounds.

When two images (a target image i and a reference image j) are determined to have matching background features, the element $w(i,j)$ is set to 1; otherwise it is zero. Alternatively, the value of $w(i,j)$ can be a function of the number of feature points that correspond between the target image and the reference image (with more feature points that are shared between images i and j resulting in a higher score for $w(i,j)$).

Next, a segmentation or clustering of the digital images is performed to produce a set of co-located events 227. The segmentation can be performed with any of a number of algorithms. For example, the normalized cut algorithm (see J. Shi, J. Malik, "Normalized Cuts and Image Segmentation," PAMI, 1997) can be used. In the preferred embodiment, an agglomerative clustering algorithm is performed. Each image begins as its own cluster. The distance between two clusters is defined as the minimum of the distances between any image from the first cluster to an image in the second cluster, where the distance between image a and image b is: $D(a,b)=-\log(w(a,b))$. At each iteration, the minimum distance between any two clusters is found. If this distance is smaller than a threshold, then the clusters are merged.

Figure 6:
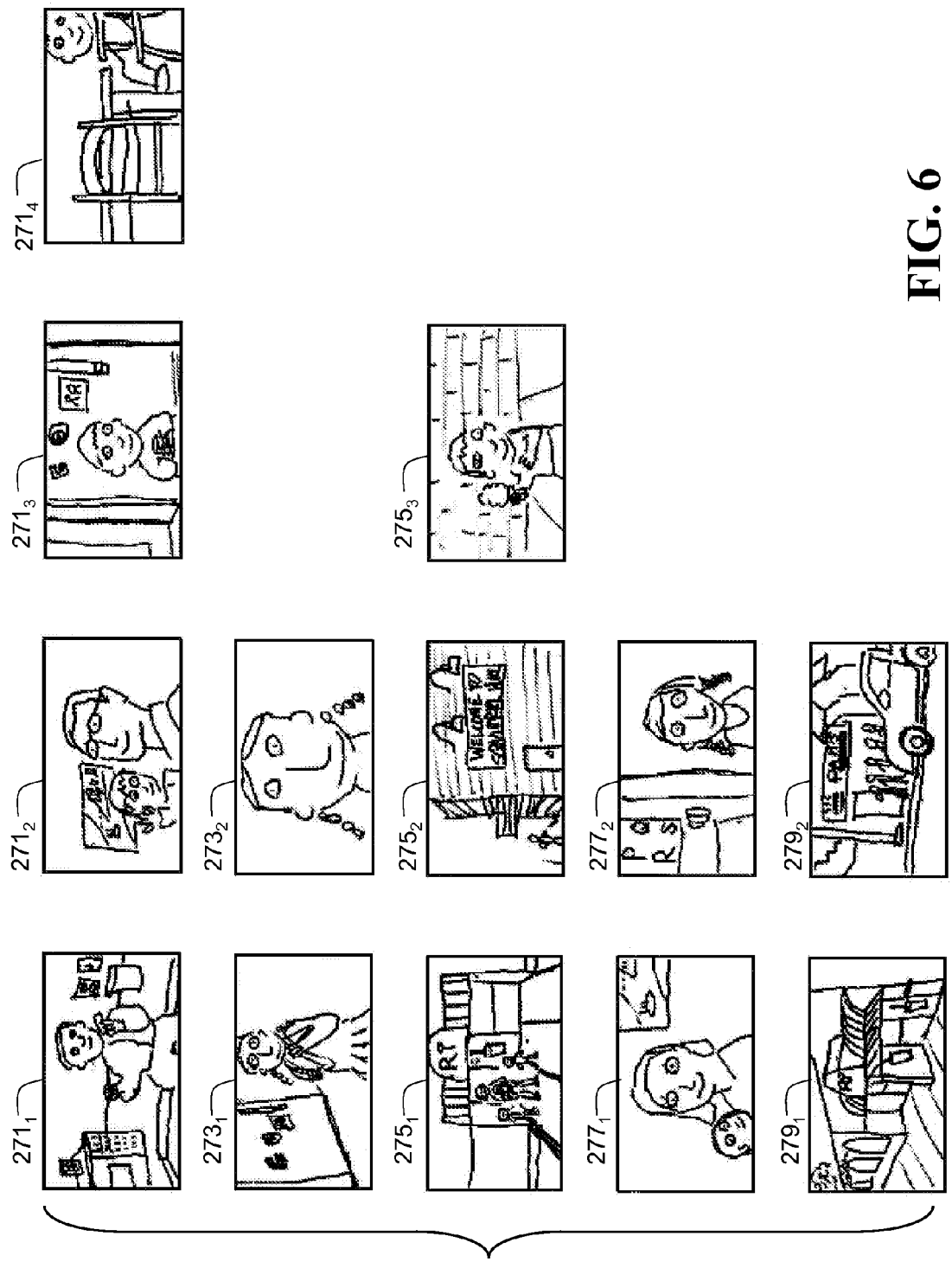
FIG. 6 is a set of example images from an image collection, used to illustrate the present invention.

The embodiment is further explained with reference to the images shown in FIG. 6. In FIG. 6, there are 5 events, 271, 273, 275, 277, and 279, containing 4, 2, 3, 2, and 2 images respectively. Table 1 summarizes the events and images contained in the events.

TABLE 1

| Event | No. Image | Location | Date |
|---|---|---|---|
| 271 | 5 | Kitchen, photographer's home | July 2006 |
| 273 | 2 | Kitchen, photographer's home | August 2006 |
| 275 | 3 | Squirrel Hill, Pittsburgh | November 2006 |
| 277 | 2 | Kitchen, photographer's home | January 2007 |
| 279 | 2 | Squirrel Hill, Pittsburgh | Aug 2007 |

Referring to FIGS. 5 and 6, features are extracted by the feature extractor 221 as previously described to produce the location features 223. The event comparator 225 compares pairs of images as previously described. Note that the image $271_2$ contains the same picture in the background as image $277_1$, which indicates that it is likely events 271 and 277 are co-located. Similarly, images $273_1$ and $1271_3$ have a common background (refrigerator art) as do $275_1$ and $279_1$ (similar storefront.). These common background feature points are found by the event comparator 225, which determines that there are two co-located events 227: the first contains events 271, 273 and 277, and the second contains events 275 and 279.

Notice that event 271 served to 'bridge the gap' between events 273 and 277. Both events 273 and 277 occurred in the kitchen, but they did not happen to share any common background. Event 271 contained an image ($271_2$) with background similar to event 277, and another image ($271_3$) with background similar to event 273. Therefore, in the absence of event 271, the inventive method would be unable to recognize that events 273 and 277 are co-located.

It should be understood that the co-located events 227 essentially describes which sets of images are captured at common locations. For this reason, the co-located events 227 are also called the common location description.

A labeler 229 is used to label the co-located events in a manner that conserves user effort. The labeler 229 allows a user to provide a descriptive label 231 that describes an image, an event, or a co-located set of events. The terms "tag", "caption", and "annotation" are used synonymously with the term "label." The label 231 could name a person in the image, the location of the image (e.g. "Lake Ontario" or "grandma's house"), a name of the event taking place (e.g. "birthday party", or a general description of the image or event (e.g "happy").

The label interpreter 233 analyzes the label 231 to determine whether is describes a person, a location, an event, or something else. This analysis is accomplished through natural language processing. To determine whether the label 231 is a location descriptor 235, the label 231 is compared with labels in a database of place names. The database contains place names such as cities and villages, points of interest, natural geographic features such as rivers, lakes, mountains and the like. The place names also contain generic location phrases such as "my house", "park", or "playground". The label interpreter 233 determines that a label 231 is a location descriptor 235 when the label 231 is found in the database of place names.

For example, the user labels image 271₁ as having location "home". This label 231 is determined to be a location descriptor 235 by the label interpreter 233 and is propagated to the other images which are co-located, according to the common location description of the co-located events 227 (for example, the other images in event 271, the images from event 273, and the images from event 277). Likewise, image 279₂ is labeled as "Squirrel Hill, Pittsburgh" and the label propagates to the other images which are co-located, (i.e. the images from event 275 and the image 279₁).

The label can also be the geographic location of the image or event. For example, the camera records the location from a GPS device that is integral with the camera, or a GPS device that communicates with the camera, or a GPS device that simply records time and position coordinates and the image capture time is used to find the location of the image capture. This location label propagates to the other images which are co-located, as previously described. For example, if image 279₂ is labeled as "Latitude 40.438161, Longitude −79.925194", the label propagates to the other images which are co-located, (i.e. the images from event 275 and the image 279₁). This is particularly useful when one event includes images that are not tagged with geolocation information, but are determined by the event comparator 225 to be co-located. Then, the images from the event that were originally not tagged with geolocation information become tagged with the geolocation information.

GPS labels can also be used to prevent false positive background matches from occurring. As previously described, the event comparator 225 compares an image i with an image j to determine if there are matching background points. However, if both image i and image j have associated labels indicating a geolocation (e.g. latitude and longitude, or zip code), then the location information is also examined to determined the values of $w(i,j)$. If the distance between the associated image capture locations is large (e.g. greater than 3 kilometers), then $w(i,j)$ is set to zero and no further processing is necessary.

These labels facilitate searching for images captured at a particular location. A user can search for images captured at a particular location of interest (by for example, clicking on a map to indicate the location of interest, entering an address to indicate the location of interest, or indicating an image that was captured at the location of interest). Images that have been tagged with a corresponding location are then returned to the user.

Note that the image collection 202 can include image captured by only a single photographer, or can include images captured from any number of photographers. The images in an event 217 can come from the internet, a friend, or from any other datasource (e.g. a video or movie).

Referring again to FIG. 5, a user issues a query 151 for images in the collection. The query related to the geographic location of images, for example, for images captured in Rochester, N.Y., or images captured in the same location as that of a particular exemplar image. The query 151 can be initiated by voice command, by text, or through a user interface. An image selector 153 then examines the location descriptors 235 of the images in the collection (and of the exemplar image(s) if provided and uses this information to produce image search results 155. The image search results can include a list of relevant images and videos, for example.

The invention has been described in detail with particular reference to certain preferred embodiments thereof, but it will be understood that variations and modifications can be effected within the spirit and scope of the invention.

| PARTS LIST | |
|---|---|
| 10 | images |
| 20 | background area |
| 30 | grouping by color and texture similarity step |
| 40 | common backgrounds |
| 42 | indexes generated |
| 50 | detecting people |
| 55 | images |
| 60 | locating vehicles |
| 65 | image |
| 70 | main subject regions |
| 75 | locating a sub-set of regions |
| 80 | image |
| 90 | image background |
| 95 | face region |
| 100 | clothing region |
| 105 | background region |
| 110 | locating events and sub-events |
| 120 | computing description for sub-event step |
| 130 | clustering backgrounds based on similarity step |
| 140 | storing clusters in index tables step |
| 150 | text labels |
| 151 | query |
| 153 | image selector |
| 155 | search results |
| 202 | image collection |
| 203 | collection information |
| 209 | event clusterer |
| 217 | event |
| 221 | feature extractor |
| 223 | location features |
| 225 | event comparator |
| 227 | co-located events |
| 229 | labeler |
| 231 | label |
| 233 | label interpreter |
| 235 | location descriptor |
| 610 | target images |
| 620 | clustered match points |
| 630 | filter |
| 632 | removing clusters |
| 634 | removing points |
| 636 | removing points |
| 640 | match scores |

The invention claimed is:

1. A method of matching background regions between a reference image and a target image, comprising
   (a) determining the background regions for the reference image and the target image;
   (b) locating feature points in the background of the reference and target images;
   (c) matching feature points in the reference and target images;
   (d) clustering matched points in the target image into spatially compact regions in an image coordinate space to produce a set of target clusters;
   (e) clustering matched points in the reference image into spatially compact regions in the image coordinate space to produce a set of reference clusters;
   (f) finding a matching target cluster for each of the reference clusters by counting a number of matched points between target and reference clusters;
   (g) removing reference clusters based on the count of the number of matched points;
   (h) computing a match score between the reference and target images from the remaining reference clusters; and
   (i) using the match score to determine whether the reference and target images are captured in the same location.

2. The method of claim 1, wherein step (h) includes:
   (i) removing points in the reference clusters that are not coherent with a global trajectory of matched points; and (ii) removing points in the reference clusters that violate compactness of clusters.

3. The method of claim 1, wherein the match score in step (h) incorporates:

geographic distance between reference and target images.

4. The method of claim 1, wherein a label that indicates a common location is provided for the reference and target images when it is determined that the reference and target images are captured at the same location.

* * * * *